(12) United States Patent
Woehl

(10) Patent No.: US 6,574,634 B2
(45) Date of Patent: Jun. 3, 2003

(54) CREATING, TRANSLATING AND PUBLISHING LARGE INFORMATION PLANS TO A NETWORK

(75) Inventor: Roger Woehl, Novato, CA (US)

(73) Assignee: Enwisen Inc.

( * ) Notice: Subject to any disclaimer, the term of this patent is extended or adjusted under 35 U.S.C. 154(b) by 272 days.

(21) Appl. No.: 09/801,940

(22) Filed: Mar. 8, 2001

(65) Prior Publication Data
US 2002/0129034 A1 Sep. 12, 2002

(51) Int. Cl.[7] .................. G06F 17/30; G06F 17/60; G06F 15/16; G06F 15/00
(52) U.S. Cl. .................. 707/102; 707/104.1; 707/1; 707/5; 715/513; 709/217; 709/218; 709/219; 705/4
(58) Field of Search .................. 707/102, 104.1, 707/1, 513; 709/217, 218, 219; 705/4

(56) References Cited

U.S. PATENT DOCUMENTS

| | | | | |
|---|---|---|---|---|
| 5,930,804 A | * | 7/1999 | Yu et al. | 707/104 |
| 5,940,834 A | * | 8/1999 | Pinard et al. | 707/102 |
| 5,999,929 A | * | 12/1999 | Goodman | 707/7 |
| 6,144,962 A | * | 11/2000 | Weinberg et al. | 707/10 |
| 6,230,196 B1 | * | 5/2001 | Guenthner et al. | 709/223 |

* cited by examiner

Primary Examiner—Frantz Coby
(74) Attorney, Agent, or Firm—David T. Bracken

(57) ABSTRACT

The invention is a data structure published to an access viewer network such as the Internet or a wide area network. The deployment and publication of the data structure results in topic pages containing content items displayed for the access user. Means accomplish subscription and changes to the published data structure with minimal re-publication or re-deployment changes, thereby minimizing uploading time.

18 Claims, 4 Drawing Sheets

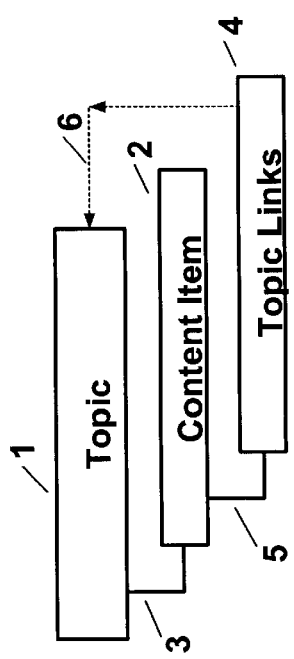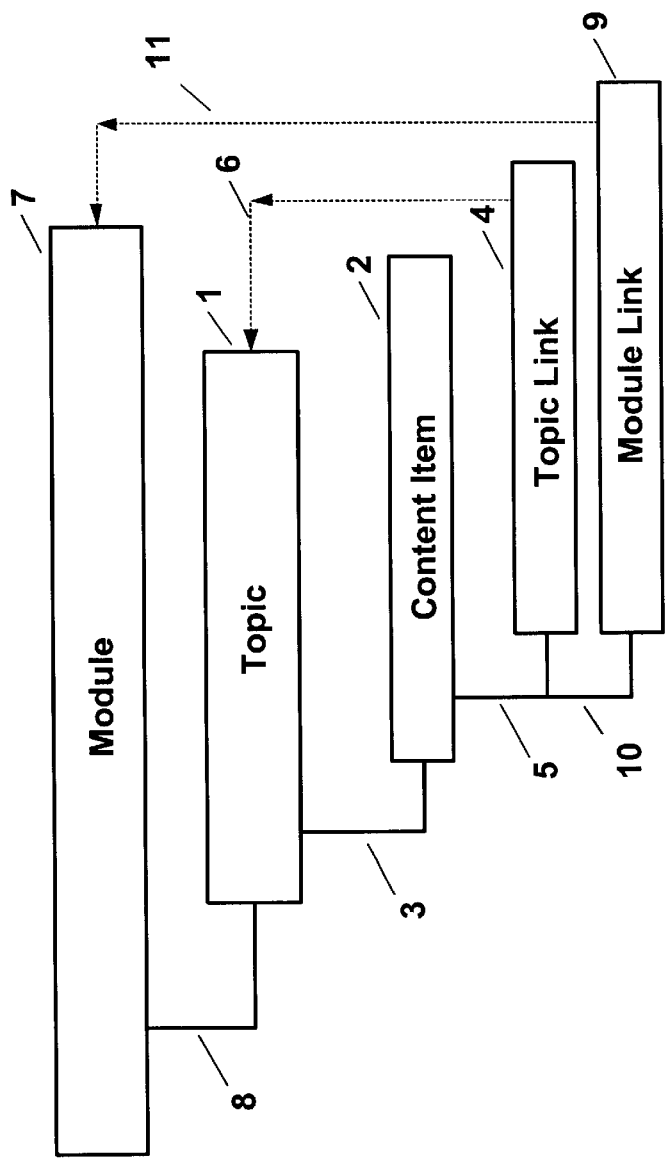

CREATING, TRANSLATING AND PUBLISHING LARGE INFORMATION PLANS TO A NETWORK

BACKGROUND OF THE INVENTION

The present invention relates to a method of managing large volumes of information, intended for access on the Internet, where the information needs to be customized for unique users, displayed in multiple formats, and readily linked to other managed information or information on the Internet.

The advent of the Internet and the Internet browser has made it possible for people to view information from an access nodes, typically a personal computer or network computer, but more recently from such devices as PDA's, cellular phones and Internet-enabled televisions, to name only a few of the many devices that are capable of Internet access. Furthermore, the World Wide Web permits finding and viewing, sequentially for better understanding in some cases, needed information by way of web pages, URLs, and hyperlinks. Although there exist many methods of locating, viewing and using information, the prior art does not contain a relatively simple process for managing information, customizing it for specific audiences, and/or automating many of the tasks associated with creating and maintaining a web site. Managing, adapting and making quickly available for use needed information to be displayed on one or more linked web sites is generally defined as the actions of a web publishing system.

In particular, the current invention relates to

One application for such a system is in the publishing and distribution of benefits information for corporate employees. As companies provide benefits to employees, it becomes necessary to publish the entire literature recording what is covered, and how benefits are to be used. The basic facts of the information presentation are determined in part by requirements such as federal and state statutes and case law, company policies, union contracts and insurance policies. Such requirements often change, as the laws and economic advantage to a company or union change with renewed lawmaker interest in tinkering with the statutes or a desire to improve quarterly profits.

Internet publishing of benefits information is complicated because a single company often offers multiple benefit plans for the same type of benefit (such as medical or dental insurance), however; each plan will have different coverage costs and limitations. In addition, a single insurance company may have made substantial changes in a generally offered plan to meet the marketing needs to a particular customer, so that the details of each plan may need to be specifically customized to the needs of individual companies, making it necessary for an insurance company to publish custom versions of plan information, even though they may be substantially similar to insurance plans for other companies.

With the growth of the World Wide Web, company HR departments saw a natural means of distributing benefits information through the Internet. With a little effort plan information could be converted to an appropriate format for posting on the web at a company owned web site or at a web site maintained on its behalf. Without a consistent navigation and organization structure the web site was not particularly useful for locating plan information.

SUMMARY OF THE INVENTION

The present invention comprises a subscription method for Internet viewer use of large and varied amounts of changing information. A first step requires forming a standard information structure particularized to an application, i.e., grouping facts or pieces of data into human factor-useful fact bodies or originating information bodies that are easily reviewable such as specific health benefits for a company benefits plan. Differentiated, segmented or sequentially entered originating bodies of information are selected from a larger group of originating bodies of information, where the selected originating bodies of information are then authored into a common library and the authoring action transmits with the authored bodies of information a record of the source of each piece of data as a portion of the body of information. Data in each authored body of information within the common library may be amended or deleted (i.e., selectively customized) to conform with desired viewing by Internet access users. All or part of the data within an originating and/or authored body of information (which may have been changed) is optionally linked for automatic updating from other source bodies of information, where those source bodies of information contain data which a particular subscriber company is permitted access by the invention system.

In a specific example below, the bodies of information contain data for employee benefit plans. Some of the data in at least one of the bodies of information is customized to the unique requirements of a hypothetical company. This method makes it possible to maintain a common library of benefit plan information that can be quickly customized and published to the Internet. It is intended that the subscriber company have customization access only to the common library of benefit plan information.

Published information in a standardized web site organization can be easily navigated to find needed information. The subscriber company can thus eliminate concerns about software and web site organization requirements for making its benefit plan information available to its employees and others. The invention method makes it cost effective for even the smallest companies to input, publish and update online access to benefit plan information. References herein to the Internet and "web pages" and "web site" extend to the many forms of computer networks in which a portion of the invention system operates on data whereafter that data is "published" to a common access location as in the present example using the Internet. Clearly intended extensions of the invention system are to wireless and wired LANs, WANs, intranets, extranets, and the many permutations thereof now and hereafter developed with the invention data operation and publication functions.

It is an object of the invention to create a system that automates the process of linking web pages in a web site via changes to a common library and subsequent publication to the Internet.

It is another object of the invention to manage content and information separately from the specific files in a format required for publication to a web site.

It is yet another object of the invention to add links to data that is included in a web site.

It is still another object of the invention to remove links to information that is not included in a web site.

It is yet another object of the invention to provide a method to create a standard data structure for related subject matter.

It is another object of the invention to create a common navigation structure for information in a web site.

It is another object of the invention to allow customization of information for individual viewing audiences.

It is another object of the invention to allow a unit of content to be shared in multiple locations within a body of information.

It is another object of the invention to allow content to be contextually interlinked to related content.

It is another object of the invention to separate the process of authoring content from the process of designing and creating web sites.

It is another object of the invention to allow common topics in different information plans to be easily compared.

DESCRIPTION OF DRAWINGS

FIG. 1 is the invention basic data structure.

FIG. 2 is the invention basic data structure organized by modules.

BRIEF DESCRIPTION OF THE INVENTION

Data Structure

Figure 3:
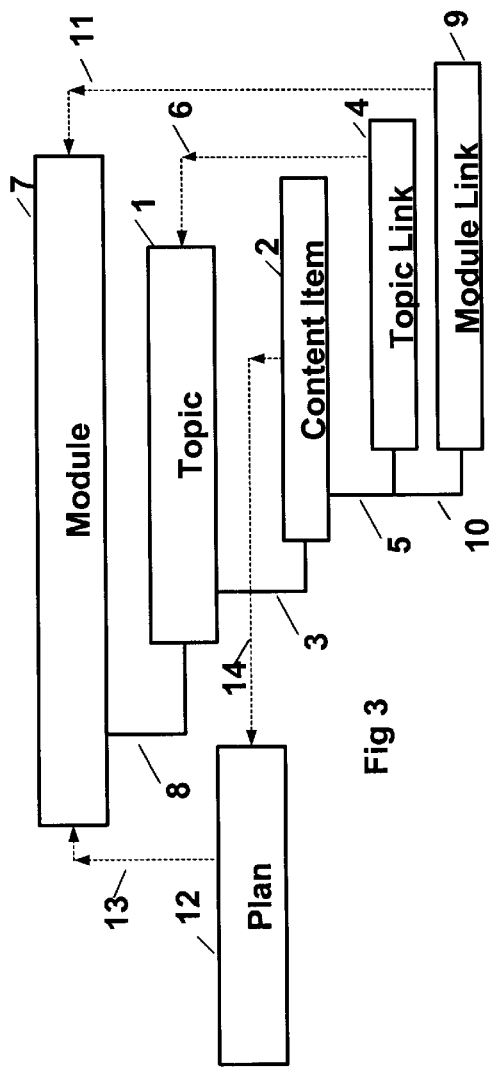
FIG. 3 is the invention basic data structure including module and plan organization.

The invention provides a method of organizing data into bodies of information within a standard data structure, where the data can be readily customized, updated and published to the Internet for easy access. There are 7 interrelated functions that are performed, as listed:

1. Standardize information structure.
2. Standardize link addresses.
3. Store plans in a common library.
4. Customize information for an audience.
5. Interlink related information.
6. Organize information into a consistent navigational framework.
7. Publish information with template format and layout.

EXAMPLE 1

Four Step Publication Embodiment

An embodiment the invention data structure is shown schematically in FIG. 1. FIG. 1 is a schematic view of the basic objects or tables in a relational database where each box represents one or more records in a table, and the connecting lines are data relationships. The basic unit of information management is a content item 2. Content item 2 stores a block of text information that can be as small as a single word, or as large as an entire page or more of text. Along with the text information, content item 2 stores several properties that define how it should be managed. Each content item is associated with at least one topic 1, by means of a relational link shown as a line 3. Relational links are maintained in the data structure as a foreign key number, using methods that are common to relational databases. The relation between topic 1 and content item 2 is a one-to-many relationship, with a single topic having as many content items as are required. Topic 1 has a unique ID number, and a short name and description of the topic.

Content item 2 has a one-to-many relationship 5 with a topic link 4. Topic link 4 relates a specific content item 2 to other topics 1 in the database than the one(s) with which the specific content item 2 has relationships 3. Each topic link 4 stores a relationship link to a unique ID for each of those other topics 1, as shown in FIG. 1 as relationship 6. Using the basic structure shown in FIG. 1, content items 2 can be related via relationships 3 into one or more topics 1. Each content item 2 can have relationships 5 to topic links 4, thereby being linked to topics 1 by relationship 6.

FIG. 1 shows a schematic view of the data structure as it is stored in a relational database. This data structure contains the originating bodies of information for the invention system. However, to make data viewable as web site pages on the Internet, the relational data structure must be converted to a physical html page and link structure. One method of creating web pages is to use a deployment algorithm to convert from one structure to the next.

Figure 5:
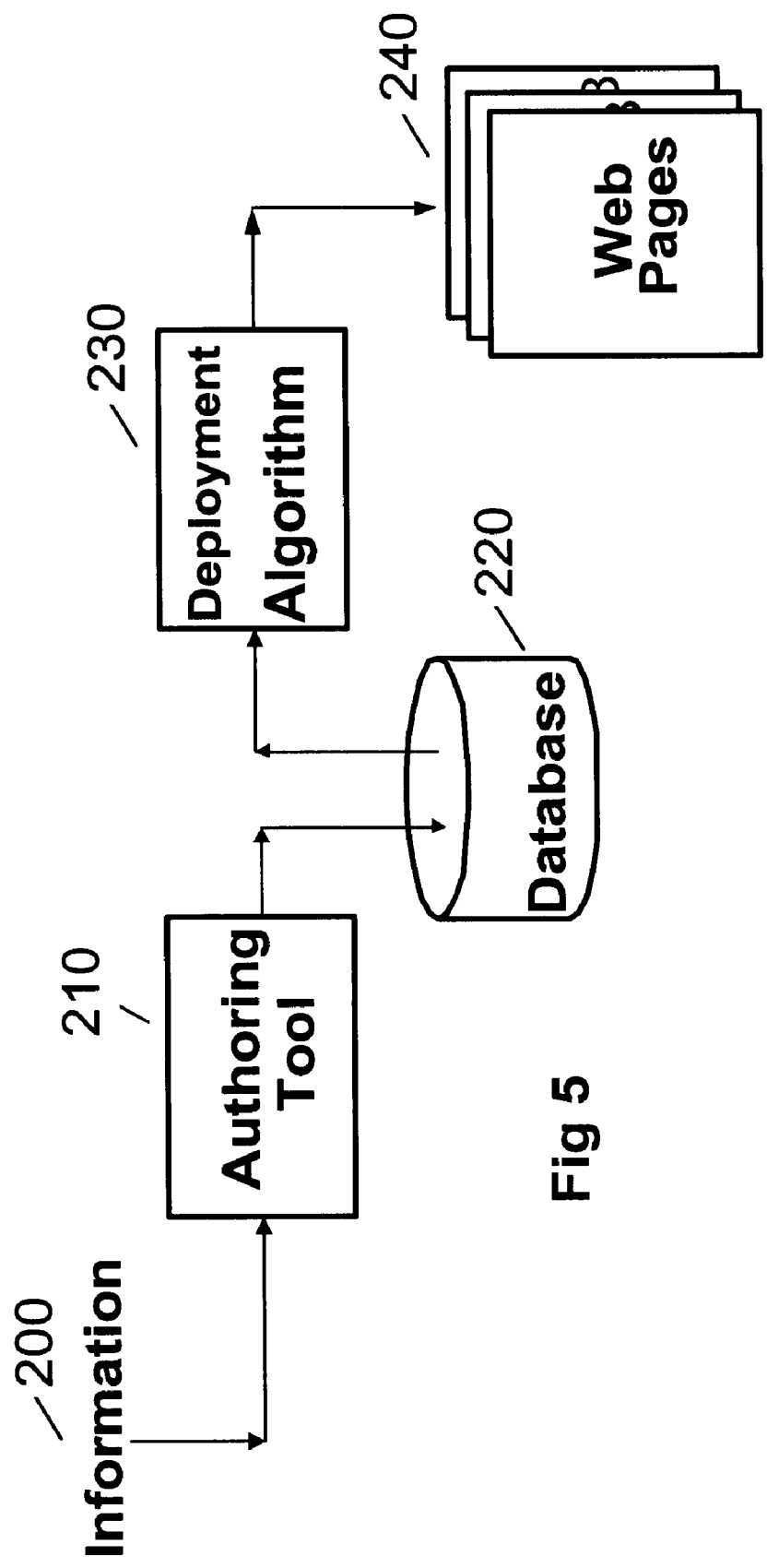
FIG. 5 shows creation, deployment and publication of the invention data structures.

FIG. 5 shows how originating information 200 is transformed into a data structure in a database 220. Information 200 comprising the pieces of data for the invention system is accepted for input and management by an authoring tool 210, a software program adapted to create and make changes to a relational database, among other functions. The authoring tool 210 causes information 200 to be formed into the invention data structure in a database 220, as shown in FIG. 1. A deployment algorithm 230 operating on the invention data structure in database 220 extracts data from the database 220 and organizes it into a series of web pages 240.

For deployment algorithm 240, information in the data structure of FIG. 1 and implemented in database 220 is organized into web site pages, where each page displays the content items 2 for one topic 1 connected by the relationships 3, such that the content items 2 gathered to that page are appropriately displayed for useful viewing by the access user. The page is an HTML file, or file of other appropriate format for required publication, and is given a file name derived from unique identifier number assigned to each topic 1. This method of naming files creates an addressing system that allows the topic links 4 to be converted from a relational link into an HTML link by means of an anchor tag. The HTML anchor tag is of the form <A href=[filepath]>[Link Name]</A> where [FilePath] is the path and file name to be linked to, and [Link Name] is the visible text identifying a link on an HTML page. The deployment process queries the database for each topic link 4 and converts the related topic ID into the file name of the page that holds that topics information. The file name is added to the [Filepath] portion of the anchor tag, and the topic's description is added in the [Link Name] portion of the anchor tag. Using this method, when a viewer reads a deployed web page, certain links to other topics 1 will be visible, and the subject matter of the links will be reflected by the topic's description. When selecting a link the user will be linked to the new topic, making its contents visible.

The invention method is accomplished as inferred by the associated context and functions of the invention systems and methods. Similar such steps are likewise inferred in this disclosure as understood by those skilled in the art. Relationship link 5 on publication or deployment causes a navigational link to be viewably formed and activatable at the website page to which the content item 2 of that link 5 is directed, where the navigational link when activated acts to transfer the access user's view to a website page other than the presently viewed website page. Relationship link 3 on publication or deployment causes a content item 2 to be assimilated into a website page with a particular arrangement of the content items 2 on a website page. A reverse process of database recreation from the web pages created by the deployment algorithm, i.e., a reverse deployment algorithm, is also contemplated by the invention methods where the database structure is created by simply reversing the above described deployment steps.

The preceding describes a simple embodiment of the invention. The subsequent embodiments more fully detail the organization of information and the ability to uniquely customize information for specific viewers.

Modules and Plans

FIG. 2 shows the data structure with an addition of a module object 7. Module 7 creates one or more groups of one or more topics intending that such groups are related subjects at both the database 220 and web pages 240 levels. Topic grouping at the web pages 240 level preferably creates a display visible to a user showing a listing of the related subjects (related topics).

In FIG. 2, Module 7 has a one-to-many relation with one or more topics 1 by relationship 8. Module 7 provides that a group of topics may be related, as in a web site display, under a common concept, i.e., the module concept, similar to the relationship of a content items 2 with a topic 1. Complementary with module 7, a module link 9 relates content item 2 with a particular module of information by way of relational links 10 and 11. Link 10 is a one-to-many link between the content item 2, and relationship 11 is a one-to-one link between a single module link 9 and a single module 7. Rather than linking to a particular topic 1, the module link 9 provides a link to an entire subject, i.e., the module concept. Links 9 are converted from relational links to HTML links in a process similar to that of relationship 3 at the time of deployment. A module 7 has a property that defines a single page to be used as an introduction page for the entire subject matter. It is this page that is linked to when module link 9 is deployed.

The access user may be presented in a website page, upon deployment of the data structure of FIG. 2, with the viewable information of a specific content item 2 and navigational links to other website pages representing topics and/or modules to which the specific content item 2 has been linked by relationship links 5 and 10 respectively.

Referring now to FIG. 3, the data structure is shown with the addition of a plan 12. Plan 12 creates a one-to-one relationship to the module 7 by relationship link 13. Each plan 12 is associated with a single module 7. The embodiment of FIG. 3 incorporating plan 12 provides the means or function to select only those content items 2 and their relationship linked objects for publication or deployment to website page that are desired for a particular presentation of, say, a benefits plan for a specific customer. In this way, multiple editions or versions of each module 7 can be created by the filtration or selection capability of a plan function as in plan 12. Content item 2 has a property that allows it to be associated with a particular plan 12 by means of the relationship link 14. By grouping content items 2 in each topic 1 by a plan 12, different versions of plan information can be made available to different groups of access users by providing access only to a plan 12 specific to the one group.

Using the example of a medical benefit plan, a version of the medical benefits information can be published for different of medical plans. Each plan 12 would start the same topics 1 and information structure as in FIG. 3, however the content items 2 in each topic 1 would be unique to the plan 12 via the selection means at the plan 12 level. In this way, a module 7 created in the database with all possible content items 2 that might arise from use by an access user would eliminate at that stage the requirement for discrimination in the information to be entered, a useful aspect for a medical insurance company who could enter all its benefits under appropriate topics and provide different plans 12 to restrict user access views only to the appropriate benefits information.

If a particular content item 2 was not associated with any plan 12, it is an option that such a plan-unrelated content item 2 be viewable on deployment globally between all plans 12. Using the medical plan example, a topic 1 can include generic information on a subject such as "What is a Hospital" and its content items 2 could be common among all plans, and thus a single content item 2 could be used as part of the information shown to the access viewers in all plans.

Pre-deployment programming of database 220 for deployment by deployment algorithm 230 optionally includes large scale linking of data structure aspects such as content items 2, topics 1, modules 7, plans 12 to each other via their relationship links. In a specific example, large scale linking would result in linking all content items 2 to all topics 1. To obtain greatly reduced publication time after an initial publication, large scale linking may consist of linking content items 2 to more topics 1 than initially required for initial access viewer needs on the deployed web pages. On first publication of the data structure of database 220 to web pages 240, it is described above that all the relationships would be published with them where the plan 12 would select from among the content items that would be finally viewable by the access user. Thus, to change the information displayed for the access user under a plan 12, only a change in the selection criteria plan 12 is required. Thus, with an initial database structure with more relationship links than are required but whose effect can be shielded by another portion of the database structure, the invention system can amended, delete or create published or deployed plans, modules or topics without needing to re-publish or deploy the time intensive transmission requirements of content items. The invention system may publish or deploy only new or changed content items and the revised linkages.

Plan Deployment

Considering now the deployment algorithm 230 as shown conceptually in FIG. 5, information is viewable by access users by subject matter and version as defined by a plan 12. Each topic 1 in the module 7 is published with the content items 2 associated with a plan 12 embodiment, such that a common or appropriately linked website is or websites are created with a structure appropriate for viewing and/or manipulation by the subscriber. It is preferred that the structure and information of a plan 12 embodiments or enhanced versions thereof not be capable of change of content items or their associated structure unless by the invention authoring input and database creation steps.

Publication or deployment of the content items, links, topics, modules and plans creates a specific structure for one of the many of the forms of user interfaces possible for arrangement of the information of a plan 12. In one form of the invention system the specific structure of the user interface at a website may be changed without access of the plan 12, i.e., arrangement of certain topics may be more easily understood in a priority list instead of alphabetically, whereby such a change may be achieved without a re-publication or deployment.

For ease of location and programming, all of the files created for a particular plan may be stored in a single folder or directory. The directory created for that purpose is uniquely named using a unique numeric ID associated with each plan. Linking of content items, topics, modules and plans (and associated links) is performed, as before, however, when a topic in one module is linked to a topic in another module the file path in the anchor tag must include the plan directory name in addition to the topic file name. The introduction of a plan 12 creates other linking opportunities in context customization as described in the following paragraphs.

Audience Customization

Figure 4:
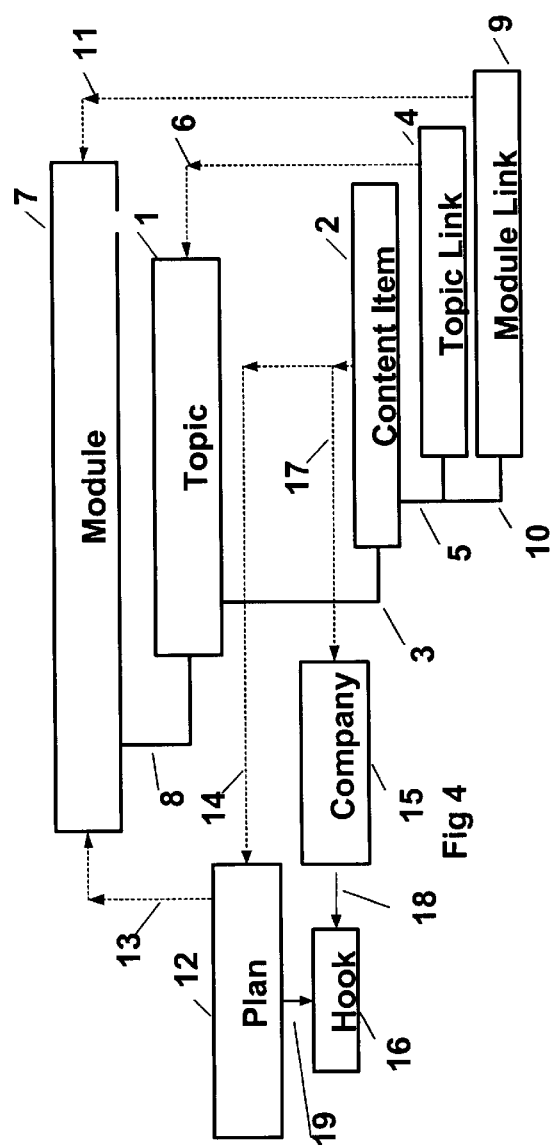
FIG. 4 is the invention basic data structure showing plan customization layer.

Referring now to FIG. 4, the data structure is shown with the addition of a company object 15 or company function 15. The company 15 defines particular audience requirements imposed as construction parameters for plan 12. The company 15 is, in a specific example, represents a subscriber customer of a plan 12, who is permitted limited access to the database structure so that only a strict range of options are available, such as a benefits plan administrator who has authority to disseminate new or changed plan information. So, a subscriber may desire a service that presents for viewing or manipulation (such as interaction of plan options for display of a medical plan benefits) only current or proposed medical plan benefits that are only a part of a previously published module 7. The relationship between a company 15 and the plans 12 it subscribes to is maintained my means of a hook 16. Hook 16 supports a many-to-many relationship between companies 15 and plans 12 as shown by relationship links 18 and 19. A company 15 represents a subscriber having the potential to subscribe to as many plans 12 in as many modules 7 as are needed and available. In one embodiment, a plan administrator of a subscriber may have access through company 15 to a hook function 16 to permit access user viewing of or remove from viewing some content items 2 as desired to represent benefits plan information then available from a customer entity to its employees, i.e., an example of a typical access users.

FIG. 4 shows a link 17 between content item 2 and company 15. Content item 2 has a property that can be set to relate it to a company 15. This relation 17 allows content to be associated with an individual company. By using this relationship a plan 12 embodiment can be customized by adding content items 2 that are related to both the plan 12 and an individual company 15. When the content is deployed in a form viewable by the access user, the content items 2 selected by company 15 are shown along with the plan 12 content items. In this way, the same basic plan 12 can be published with different pieces of information for different subscriber companies. Using the example of a medical benefit plan, several companies may subscribe to the same benefit plan, however, each company could have a custom content item that identifies a unique plan cost. Thus, this embodiment permits creation and availability for deployment customer-specific content items that are not accessible by other subscriber customers.

Company Plan Deployment

Figure 7:
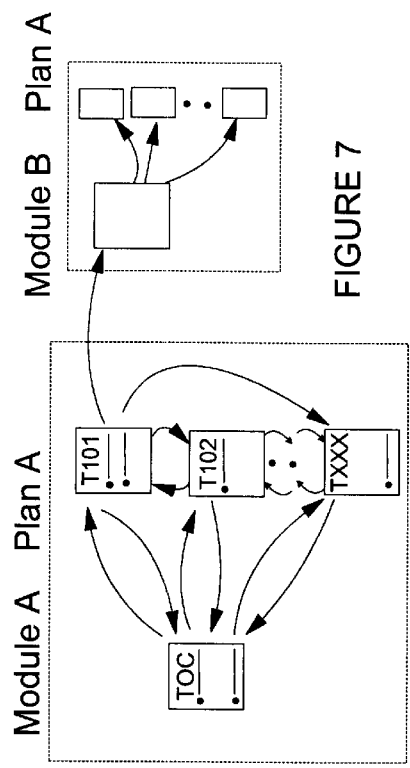
FIGS. 7 and 8 show a relational map of hyperlinks between plans, modules, and topics.
Figure 8:
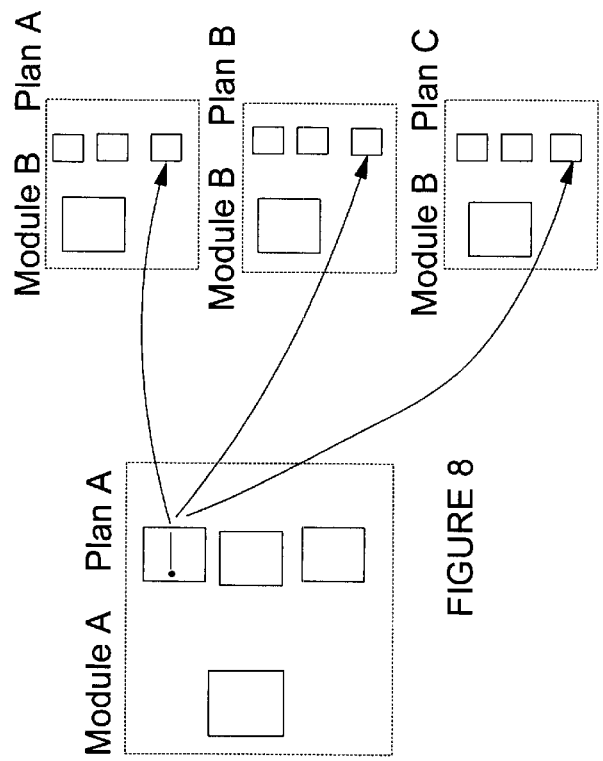
Figure 6:
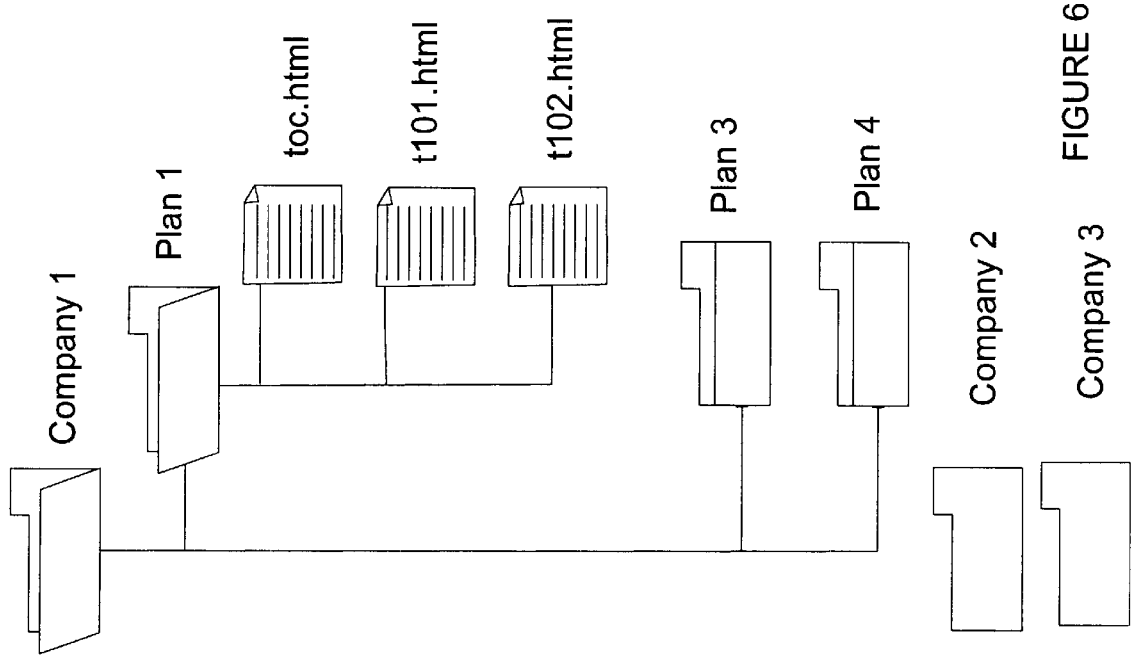
FIG. 6 shows a preferred publication file structure.

Considering again the deployment algorithm 230 as shown conceptually in FIG. 5 and with reference to FIG. 4, one or more plans 12 are deployed for a specific company 15. Plans 12 may be deployed on publication into a single folder that is uniquely identified the company name and id number. The folder segregated plans 12 form a completed information web site targeted to the unique needs of the company. FIG. 6 shows this file structure for Company's 1–3, with subfolders for Plans 1–3 for Company 1, and subfolders for a first page and other topics 2 under a plan 1 (plan 12 of FIG. 4). FIGS. 7 and 8 show the invention data structure relationships for FIGS. 3 and 4 permitting hyperlink access to the several modules and plans for the access user.

In addition to customizing the content of a particular subscriber, it may be necessary to customize the links between content items 2 to match the plans 12 that are subscribed to by company 15. As defined shown in FIG. 4, topic links and module links are established relationally without reference to a particular plan. A link to a topic or module may be defined without knowing how many plans, if any, a particular company will subscribe. Therefor, it becomes a task for the deployment algorithm to assess which plans are subscribed to. Three basic situations arise. 1) No plans are subscribed to, 2) one plan is subscribed to, 3) multiple plans are subscribed to.

In case 1, the deployment algorithm identifies a link to a topic in a particular module, the database is queried to see if any the company has any plans subscribed in the module that contains the link to topic. If the query returns no results, then no link is placed on the page, and the a user will have no awareness that other information modules exits.

In the case where a query returns one plan, the algorithm can simply create an HTML link to the plan. In the case where multiple plans are subscribed to, the deployment algorithm must provide a link to the topic(s) in each plan so that the user can select which particular plan they which to see. One method of creating a link with multiple choices is to use a drop down box that lists all of the available plan.

The data structure and linking methodology allows an authors of information to interlink it to other plan information, without knowing what plans may be subscribed to, if any. For example, an author could create a module and plan with general information about understanding terms in a medical plan, the article could conclude with a content item that says "for information about you're your benefit plan, see the following link:". This sentence could be followed by a link to a topic in the medical module. The author would not need to know which medical plan a company would have subscribed to of potentially hundreds of different plans. A the time of deployment, the algorithm would asses which plans were subscribed to, and the appropriate links would be created.

The above defines a basic data structure and advantages. Many additional properties can be applied to the basic data structure to achieved different features and enhancements. Such additions will be evident to persons practiced in the art.

Directory Structures

The interlinking structure as shown in FIGS. 1–5 provides a method for quickly linking between topics in a module, and linking to topics in other modules. In addition to this method there is a need to provide an overall navigation and structure to a module. This is accomplished my means of a directory structure. A directory structure organizes the order that topics appear, and groups them by category and subcategory. During deployment, the algorithm can use this structure to provide additional features.

One such feature in which a directory structure is deployed as an organization of a plan 12 is a feature referred to as a "table of contents". The table of contents is deployed from the directory structure as a web page with partial or complete list of all the topics 1 in a module 7, organized by category and subcategory, wherein the categories and subcategories correspond to additional directory structure aspects. Each topic 1 is presented as a link to the topic page, as in FIG. 6. A link back to the table of contents can be included on each topic page allowing a user can quickly navigate from one topic to the next, or to choice topics that are of personal interest.

Another feature made possible by the deployment of the directory structure to and HTML page is a "Next" and "Previous" link on each topic page. These links allow a user to move forward and backward through a module's topics, one topic at a time in the order they appear in the Directory. This feature is suited for users read the information from beginning to end.

Another feature of the deploying the directory structure includes making topics from one module in appear in the output of another module. This allows information common to many modules to be stored and managed in a single location, and then presented in context of a overall plan. A specific application of this feature is to present Human Resources contact information. The information (content item or items under a topic or topics) may be needed in all plan presentations deployed, but it is the same information. Consequently, a single module that includes human resource information can be created by links to a single set of content items, albeit potentially distributed among in a topic or topics, and the topics can be shared in many plans. The result is that the contact information page appears in the website plan presentation just like it was a part of the module without actual duplication of the information.

Removing Topics With No Content.

On occasion, a particular plan will have to remove information for a given topic in a module. When the deployment algorithm detects this situation, the topic is removed from the table of contents for that plan 12, and the topic is skipped in the "next" "previous" linking. This method has the advantage of allowing modules to scale down to meet the needs of a particular plan.

Cross Comparing Information

One advantage of the data structure is that information from different sources is organized into a common set of topics 1. This allows information to be quickly cross compared. One navigation feature that can be readily added to an output page is a link from the topic in one plan to the same topic on other plans within the same module that a company subscribes to.

Template

The content time object stores only the core information in a text format. It is possible to store the text along with HTML tags that provide a micro formatting. Micro formatting includes such things as bold or italic words, fonts, and any information tables. At the time of deployment, this content information can be inserted into a page format that includes the macro format for the pages of a module. The templates work in conjunction with the properties on the content times, to determine the order and placement of content times on a page. A template can also control page colors, fonts, layout, and it can include additional information and navigation features. A page template can have access to the properties of the data objects, and so it can display things like the company name, the plan name, the modules name, as well as the date of last revision, or another piece of information that is stored a property of the data object.

Templates also include the general navigational links on a page. Such links can include "Next" and "Previous" links, and links to the Table of contents.

Multiple Publishing Formats

An advantage of the system is that information can be published in multiple formats. For example, it is often an advantage for users of information to be able to view the entire plan information in a single document. This is an advantage when information may need to be printed out into a single document. The user can print all the information and review it way from a computer. Publishing in multiple formats is achieved by including an option in the deployment module to put the information into a single file rather than multiple files. The linking logic is modified so that links from one topic to another within the module will simple link to a different location on the single page, rather than to another page. Although reference is made in deployment or publication to HTML pages, several such languages and various formats exist such that the functions and structures of FIGS. 1–5 may be implemented as a method of universal translation from a database and authoring means operating in one operating system or language while publishing to another operating system or language.

Superceding

Often when customizing information for a particular subscriber, there is a need to change or eliminate standard plan language. This is easily achieved by operation of the authoring tool to include a property in each content item that allows it, on deployment, to supercede another content item on the same web page. Using this method, and company content item can be created with different information than is included in the standard plan. The company content supercede property of the company content item is then set to include the address of the plan content item that is to be superceded. Superceding replaces one content item with another, that includes all the text, and any links. This method allows the system to easily handle any exceptions to standard plan organization.

Shared Items

The relation between topics and content items can be modified to allow a many-to-many relationship. This allows the same content item to be used in multiple topics. The advantage of this is that content can be managed in one location, but used in many locations.

Authoring

Various methods can be used to input data into the database. Such methods could include client server software that allows information to be authored, configured and interlinked. Anther method includes creating web authoring tools that allow remote users to add or modify information.

Yet another method is to use a common content authoring tool such as word processor or HTML editor, and a predefined template. A software algorithm can pull data from the template, and insert it into an appropriate content item. This method has the advantage of allowing authors to use familiar tools to create and modify information.

In one alternate embodiment of an authoring method, an first entity will access the invention system via a website controlled by a second entity, typically the provider of the service for the first entity. A template is developed by the second entity based on the several plans that are offered by a third entity, i.e., a health insurance company with sufficient member companies may be inquired of to assist in the preparation of such a template. The template may then be easily completed by a first entity health plan administrator without as extensive a review of the broader set of such inputs that would otherwise need to be reviewed by the administrator or other input personnel. When such plans are changed by the third entity, an automated change may be directed by the third entity to the template and content items of the database as required.

Other Deployment Methods

The functionality described does not have to be confined to a particular deployment algorithm, rather any number of methods or possible or achieving similar output results given the underlying data structure. Such other methods include the use of XML as an intermediate output format. Another option is to pull up information in real time and present the information in completely dynamic fashion.

Additional Description of Embodiments of the Invention

FIG. 5 shows certain steps that can be helpfully though of in the following manner. Input and structuring of a database into an original database format is referred to herein as a creation step. The action of automatically resolving the database content items into a display of viewable images and resolving some of the above described links into navigational links for an access user's view is referred to herein as a deployment step. The invention includes modes of operation where the steps occur dynamically, that is, where an access user perceives a display with navigational links (such as hyperlinks) and thereafter activates one of them. The activation can result in translation of original database material into an appropriate format, which is then immediately resolved to the access user's view as controlled by the relational links established in the database structure. This dynamic mode of operation can, for some applications, reduce original and/or cumulative uploading time or file storage space for little used content items or such matter.

The present invention also comprises a method of merging a list of content fields for content items to a list of values for content items to accomplish the assembly of content items for invention data structure. The merging can take place with the functionality of the well-known option in Microsoft Word® for "Mail Merge . . . " as shown in the "Tools" pull down menu. Using that Mail Merge function, appropriate values can be combined with each content field to compose at least a portion of each content item.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:

1. A method for publishing plan information to an access user viewing network comprising:
   (a) a database structure of content items, each content item having a first relational link to one or more first topics;
   (b) one or more content items having one or more second relational links, where each second relational link is with a topic link;
   (c) each topic link is in a third relational link with a second topic different than first topics; and
   (d) operating a deployment algorithm to translate the database structure into a format for publishing to the network and storing the translated database structure, such that upon access of the network by an access user, one or more topics of the database structure each result in, as viewable by an access user:
      (i) one or more topic pages of information comprising those content items linked to each topic by the first relational links;
      (ii) one or more navigational links on one or more topic pages that on activation change the access viewer's view to another topic page representing another topic than the one being viewed, where such navigational links are the result of publication of the topic links.

2. The method of claim 1 wherein the publishing format is HTML.

3. The method of claim 1 wherein the database structure format is XML.

4. The method of claim 1 wherein the access user viewing network is the Internet, a wide area network or a local area network.

5. The method of claim 1 wherein one or more topics in the database structure have one or more fourth relational links respectively with one or more modules, whereby publication by the deployment algorithm as in step (d) results in, as viewable by the access user, each module displaying a module page having navigational links that on activation change the access user's view to a topic page representing a relationally linked topic.

6. The method of claim 5 wherein one or more content items in the database structure have a fifth relational link with one or more module links, each module link has a sixth relational link to a module, and publication by the deployment algorithm as in step (d) results in, as viewable by the access user, each topic page whose content items are relationally linked to a module by a module link showing one or more navigational links that on activation change the access user's view to a module page representing a relationally linked module.

7. The method of claim 6 wherein each of one or more plans are in a seventh relational link with a module and in an eighth relational link with one or more content items.

8. The method of claim 7 wherein each plan is adapted to, at the publication step (d) to select one or more content items for viewing by an access user, whereby only the selected content items are viewable by an access user.

9. The method of claim 8 wherein one or more company functions are respectively in one or more ninth relational links with content items.

10. The method of claim 9 wherein each company function is in a tenth relational link with a hook function, and each hook function is in an eleventh relational link with one or more plans.

11. The method of claim 10 wherein a subscription mode is achieved by operation of a company function for a customer to select one or more plans by integration with the hook function, thereby resulting in viewing by access users of only the plans and content items selected by the customer.

12. The method of claim 11 wherein subscription mode selection comprises the customer viewing, as an access user to the network, a display of one or more plan subscription links as activatable aspects of the display whereby activation of a plan subscription link by a customer results in subscription to the plan associated with the plan subscription link and a customer's personnel are thereafter capable of viewing the publication results of step (d) for only the subscribed plans.

13. The method of claim 12 wherein the customer subscribes to one or more plans and thereafter is permitted to remove fewer than all the content items or to add content items to any one subscribed plan.

14. The method of claim 7 wherein each plan is adapted to select all content items for publication such that topic pages as viewed by the access viewer cumulatively comprise all the content items selected by the plan.

15. A method for minimizing uploading time to an access user viewing network comprising:
   (a) a database structure of content items, each content item having a first relational link to one or more first topics;
   (b) one or more content items having one or more second relational links, where each second relational link is with a topic link;

(c) each topic link is in a third relational link with a second topic different than first topics; and (d) operating a deployment algorithm to translate the database structure into a format for publishing to the network, such that upon each access action of the network by an access user, one or more topics of the database structure each result in, as viewable by an access user:

(i) one or more topic pages of information comprising those content items linked to each topic by the first relational links;

(ii) one or more navigational links on one or more topic pages that on activation change the access viewer's view to another topic page representing another topic than the one being viewed, where such navigational links are the result of publication of the topic links.

16. The method of claim 15 wherein the publishing format is HTML.

17. The method of claim 16 wherein the database publishing format is XML.

18. The method of claim 17 wherein the access viewer network is the Internet, a wide area network or a local area network.

* * * * *